US008299964B2

(12) United States Patent
Janaswamy et al.

(10) Patent No.: US 8,299,964 B2
(45) Date of Patent: Oct. 30, 2012

(54) SYSTEM AND METHOD FOR ADAPTIVE CORRECTION TO PHASED ARRAY ANTENNA ARRAY COEFFICIENTS THROUGH DITHERING AND NEAR-FIELD SENSING

(75) Inventors: Ramakrishna Janaswamy, Amherst, MA (US); Dev Vrat Gupta, Concord, MA (US)

(73) Assignees: University of Massachusetts, Boston, MA (US); Newlans, Inc., Acton, MA (US)

( * ) Notice: Subject to any disclaimer, the term of this patent is extended or adjusted under 35 U.S.C. 154(b) by 312 days.

(21) Appl. No.: 12/708,785

(22) Filed: Feb. 19, 2010

(65) Prior Publication Data

US 2011/0205117 A1 Aug. 25, 2011

(51) Int. Cl.
*H01Q 3/00* (2006.01)
*G01S 7/40* (2006.01)

(52) U.S. Cl. ........................................ 342/372; 342/174

(58) Field of Classification Search .................. 342/372, 342/174
See application file for complete search history.

(56) References Cited

U.S. PATENT DOCUMENTS

| | | | | |
|---|---|---|---|---|
| 5,103,232 | A * | 4/1992 | Chang et al. | 342/372 |
| 5,477,229 | A * | 12/1995 | Caille et al. | 342/174 |
| 6,771,216 | B2 | 8/2004 | Patel et al. | |
| 7,602,337 | B2 | 10/2009 | Choi et al. | |

OTHER PUBLICATIONS

Alexander, D.K., Gray, R.P., "Computer-aided Fault Determination for an Advanced Phased Array Antenna," Antenna Applications Symposium, Univ. of Illinois,1979, pp. 1-13.

Aumann, H.M., et al., "Phased Array Antenna Calibration and Pattern Prediction Using Mutual Coupling Measurements," IEEE Trans. Antennas. Propagat, vol. 37, No. 7, Jul. 1989.

Roberts, L.G., "Picture Coding Using Pseudo-Random Noise," IRE Transactions on Information Theory, vol. 8, Feb. 1962, pp. 145-154.

Sarcione, M., et al., "The Design, Development and Testing of the THAAD (Theater High Altitude Area Defense) Solid State Phased Array (formerly Ground Based Radar)," IEEE Intl. Symp. Phased Array Systems and Technology, Oct. 1996, pp. 260-265.

Schuchman, L., "Dither Signals and Their Effect on Quantization Noise," IEEE Trans. Commun. Technology, Dec. 1964. pp. 162-165.

Takahashi, T., et al., "Fast Measurement Technique for Phased Array Calibration," EEE Trans. Antennas. Propagat.,vol. 56, No. 7, Jul. 2008, pp. 1888-1899.

Zames, G., "Dither in Nonlinear Systems," IEEE Trans. Automatic Control., vol. AC-21, Oct. 1976, pp. 660-667.

* cited by examiner

*Primary Examiner* — Jack W Keith
*Assistant Examiner* — Fred H Mull
(74) *Attorney, Agent, or Firm* — Brian M. Dingman; Mirick, O'Connell, DeMallie & Lougee, LLP

(57) ABSTRACT

A system and method of adaptively correcting the excitation or receive coefficients for a phased array antenna. For a transmitting antenna, a sensor located in the near field of the antenna is used to sense the antenna transmission. A reference signal that represents the sensor response to a desired antenna transmission that is accomplished with predetermined excitation coefficients is determined. The magnitudes and phases of the excitation coefficients are modified in a predetermined manner to create a modified antenna transmission. An actual signal that represents the sensor response to the modified antenna transmission is then determined. The excitation coefficients are then corrected using the differences between the reference signal and the actual signal, such that the modified antenna transmission becomes closer to the desired antenna transmission. The method and system also apply to a receiving antenna.

12 Claims, 13 Drawing Sheets

SYSTEM AND METHOD FOR ADAPTIVE CORRECTION TO PHASED ARRAY ANTENNA ARRAY COEFFICIENTS THROUGH DITHERING AND NEAR-FIELD SENSING

FIELD OF THE INVENTION

This invention relates to a phased array antenna.

BACKGROUND OF THE INVENTION

Phased arrays are deployed in a number of electronic systems where high beam directivity and/or electronic scanning of the beam is desired. Applications range from radar systems to smart antennas in wireless communications. It has been known for quite some time that errors (random and/or correlated fluctuations) present in the excitation coefficients of a phased array can degrade its performance. Undesirable effects resulting from errors in the magnitude and phase of the array coefficients can include decrease in directivity, increase in sidelobes, and steering the beam in a wrong direction. The degradation can be particularly severe for high-performance arrays designed to produce low sidelobes or narrow beamwidth. For example, in satellite communications, where high directivity and low sidelobes are often required, degradation of the radiation pattern will result in requiring higher transmit power or cause interference to neighboring satellites, both of which are undesirable. The sources of these errors can be many ranging from those induced by environmental changes to those caused by mistuned or failed amplifiers and phase shifters.

SUMMARY OF THE INVENTION

The invention accomplishes correction of the errors in the excitation coefficients of an array by dithering the magnitude and phase of the individual elements and observing the resulting field at a near-zone probe. By dithering here is meant deliberately introducing pseudo-random fluctuations into the array coefficients and performing expectation of the observed signal. The dithering process involves introducing pseudo-random noise to the signal (the array coefficients here) under consideration. However, the noise applied in the preferred embodiment of the invention is neither additive nor subtractive and is utilized for the purpose of regularizing a matrix involved in the error minimization procedure.

The departure of the field from that produced by the desired array (the reference field) at one or more near-zone sensors is observed and corrected using an error minimization scheme. If the random fluctuations introduced vary at a rate faster than the rate of fluctuations of the array coefficients, the array can be made to continuously remain in sync with the desired array. An advantage of the invention is that it facilitates an adaptive correction to the coefficients so that the array is made to track a given design in near-real time. Furthermore, the correction is done simultaneously for all of the elements instead of the successive approach that has previously been employed.

The nature of the random fluctuations introduced are within one's control and the preferred embodiment of the invention uses log-normal fluctuations for the magnitude and uniform fluctuations for the phase. Other element fluctuation schemes could be used. The near-zone sensor is assumed to sample the magnetic field, although the theory developed is equally valid for an electric field sensor, and so the electric field could be sensed instead of or in addition to the magnetic field. Correction for the array coefficients is preferably achieved by employing a gradient based error minimization scheme, although other means of array coefficient correction could be employed. Theory is developed herein for both the noise-free and additive white noise cases. Also, numerical results for a sample array with randomly affected magnitude and phase are presented; these demonstrate the robustness of the algorithm. The error minimization scheme employed in the preferred embodiment is based primarily on the quadratic nature of the error function with respect to the array coefficients. In this regard, the invention is equally applicable to non-linear (in spacing and geometry), planar, 3D conformal arrays or arrays with mutual coupling. For convenience and simplicity of analysis only, we demonstrate the idea behind our approach by considering a uniform linear array comprised of Hertzian dipoles and a single near-zone sensor. However, the invention is applicable to these varied array configurations. Also, the invention can apply to an electromagnetic array or an acoustic array.

Theory

Consider a linear array comprised of Hertzian dipoles arranged along the x-axis with an inter-element spacing of d as shown in FIG. 1. The axes of the dipoles are assumed to lie along the z-axis and the total number of elements is denoted by N. The normalized complex current excitation coefficient of the n-th element is denoted by $c_n=a_n e^{i\Psi_n}$, where $a_n$ and $\Psi_n$ are the magnitude and phase, respectively. An $e^{-\omega t}$ time convention is assumed, where ω is the radian frequency of operation and t is the time variable. Treating the array as an aperture in the xz-plane, the total magnetic field vector H for y>0 is given by equation 1 (note that all of the equations referred to herein are reproduced as a group below), where $g'=[g_1, g_2, \ldots, g_n, \ldots, g_N]$, with $g_n$ being the entire term inside the summation sign, but excluding the factor $c_n$, and represents the vector magnetic field due to a unit amplitude Hertzian dipole located at $x=x_n$ with current $I_o=4\pi$, $c=[c_1, c_2, \ldots, c_n, \ldots, c_N]'$, a prime denotes transpose, $I_o$ denotes a constant current amplitude, $k_0=2\pi/\lambda$ is the free-space wavenumber at the wavelength λ, corresponding to ω, $x_n=-L+(n-1)d$ is the x-coordinate of the n-th element, $2L=(N-1)d$ is the total length of the array, $R_n=\sqrt{(x-x_n)^2+y^2+z^2}$ is the distance of the observation point from the n-th element, and $\hat{x}$ and $\hat{y}$ are unit vectors in the x- and y-directions respectively. Note that the nature of the element is contained only in the terms $g_n$. The array coefficients, $c_n$, are usually designed to meet certain specifications on the far-field properties of the antenna such as its beam angle, its directivity, or its side-lobe level. For convenience, we choose $I_o=4\pi$ in the subsequent development. Due to a variety of reasons, the array coefficients can be undesirably altered over time and we denote these as $\hat{c}=[\hat{c}_1, \ldots, \hat{c}_n, \ldots, \hat{c}_N]'$ with the corresponding magnetic field $\hat{H}=g'\hat{c}$. In the following, we label the array with coefficients $c_n$ as the true array (or the desired array) and that with $\hat{c}_n$ as the actual array. An objective is to devise a means for automatically correcting for the coefficients $\hat{c}_n$. To this end, we deliberately introduce noise-like fluctuations into the magnitude and phase of the array coefficients. This is done for both the true array and the actual array.

This invention features a method of adaptively correcting the excitation or receive coefficients for a phased array antenna that comprises a plurality of antenna elements. The method contemplates locating one or more sensors or a transmitting antenna in the near field of the phased array antenna, the sensor for sensing the phased array antenna transmission, and the transmitting antenna for transmitting a signal that is received by the phased array antenna, determining a reference signal that represents either the sensor response to a desired phased array antenna transmission that is accomplished with predetermined excitation coefficients or the transmitting antenna transmission that results in a desired phased array antenna reception that would be accomplished with predetermined receive coefficients, modifying the magnitudes and phases of the coefficients in a predetermined manner to create a modified phased array antenna transmission or reception, determining an actual signal that represents either the sensor response to the modified transmission or the phased array antenna output with the modified coefficients, and correcting the coefficients in a manner that is based on the reference signal and the actual signal, such that either the modified phased array antenna transmission becomes closer to the desired transmission or the modified phased array antenna reception becomes closer to the desired reception.

The modifying step may comprise modifying the drive current for each element of the array. The modifying step may further comprise independently fluctuating the magnitude and the phase of the drive current for each element of the array. The fluctuations may be independent from element to element. The correcting step may comprise determining an error signal based on a complex conjugation of the difference between the actual signal and the reference signal. The correcting step may further comprise minimizing the error signal. The error signal may be minimized using a gradient-based algorithm. The algorithm may use all states of the total component of the modified antenna transmission at the sensor, or all states of the total component of the modified phased array antenna reception. The correcting step may alternatively further comprise minimizing a gradient of the error signal. The reference signal may be predetermined and then stored in memory for use in the adaptive correction.

Also featured is a system for adaptively correcting the drive currents or receive coefficients for a phased array antenna that comprises a plurality of antenna elements. The system includes one or more sensors located in the near field of the antenna that sense the antenna transmission or a transmitting antenna located in the near field. A memory stores a reference signal that represents either the sensor response to a desired phased array antenna transmission that is accomplished with predetermined excitation coefficients or the transmitting antenna transmission that results in a desired phased array antenna reception that would be accomplished with predetermined receive coefficients. A processor modifies the magnitudes and phases of the coefficients in a predetermined manner to create a modified phased array antenna transmission or reception, determines an actual signal that represents either the sensor response to the modified transmission or the phased array antenna output with the modified coefficients, and corrects the coefficients in a manner that is based on the reference signal and the actual signal, such that either the modified phased array antenna transmission becomes closer to the desired transmission or the modified phased array antenna reception becomes closer to the desired reception.

The drive current for each element of the array may be modified under control of the processor. The magnitude and the phase of the drive current or the receive coefficient for each element of the array may be independently fluctuated. The fluctuations may be independent from element to element. The correction may be accomplished by determining an error signal based on a complex conjugation of the difference between the actual signal and the reference signal. The correction may be further accomplished by minimizing the error signal. The error signal may be minimized using a gradient-based algorithm. The algorithm may use all states of the total component of the modified antenna transmission at the sensor, or all states of the total component of the modified phased array antenna reception. The correction may be accomplished by minimizing a gradient of the error signal. The reference signal may be predetermined and then stored in the memory.

BRIEF DESCRIPTION OF THE DRAWINGS

Other objects, features and advantages will occur to those skilled in the art from the following description of the preferred embodiments and the accompanying drawings, in which.

in equation (20), for (a) j=1 (farthest from the sensor) and (b) j=N (closest to the sensor) by numerical averaging. Exact values obtained using (16) and (19) are shown by the dashed lines.

Figure 11:
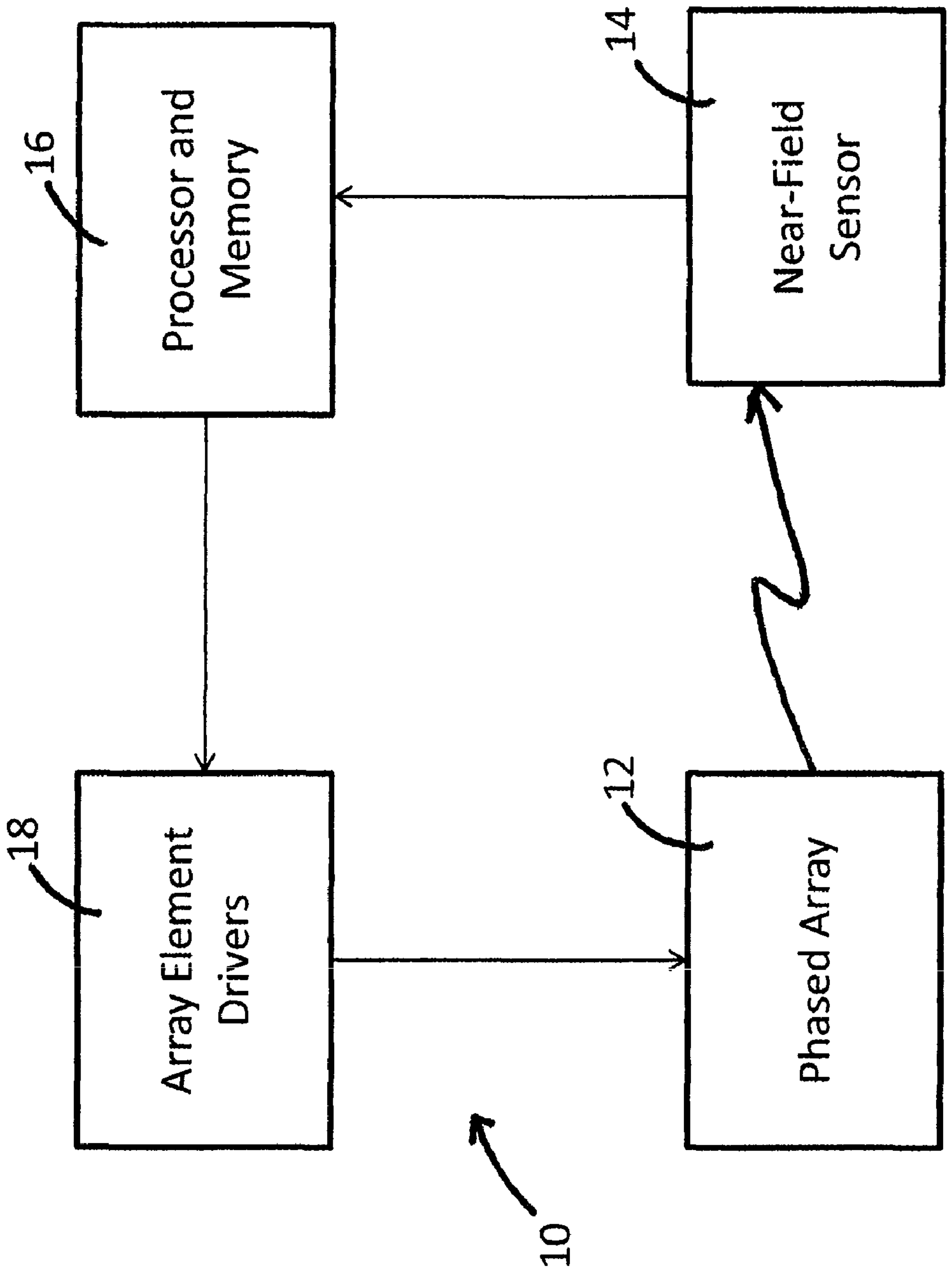

FIG. 11 is a simplified schematic block diagram of a system for the invention, which can also be used to accomplish the method of the invention.

DETAILED DESCRIPTION OF PREFERRED EMBODIMENTS

In the preferred embodiment, we assume log-normal distribution of the dithering, with a standard deviation of σ dB for the magnitude and a uniform distribution with a maximum deviation of Δ for the phase. Accordingly, the fluctuating magnitudes and phases of the true array are set as in equations 2 and 3, where $v_n$ is a unit-variance, zero mean Gaussian random variable, and $\mu_n$ is a uniform random variable over [−1,1]. Note that the noise applied is non-linear and does not appear as a additive term in the magnetic field expression (1). It is assumed that the magnitude and phase fluctuations are independent of each other and further that the fluctuations are independent from element to element. We denote the expectation with respect to these fluctuations by the symbol $\langle\bullet\rangle$.. The variance in the angle fluctuations, $\delta^2$, is equal to the value shown in equation 4. From this it is evident that $\Delta=\sqrt{3}\delta$, meaning that the peak deviation in angle is $\sqrt{3}$ times the standard deviation. Equations 5, 6 and 7 can also be easily verified.

Figure 1:
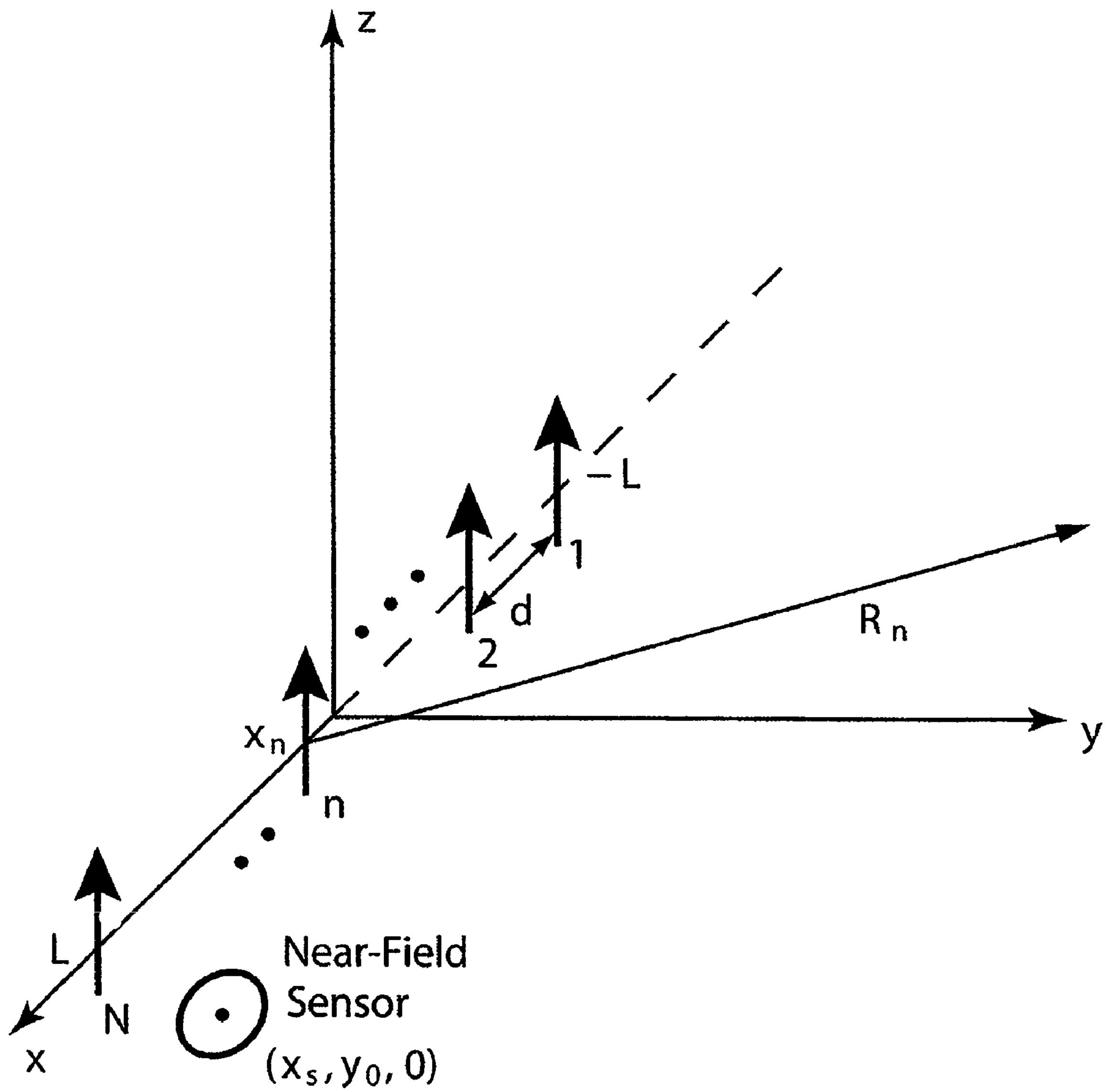
FIG. 1 is a schematic diagram of a uniform linear array comprised of Hertzian dipoles with a near-field sensor; this is one of many types of antennas with which the invention can be used.

We label the coefficients an $\tilde{c}_n=c_n e^{\alpha v_n} e^{i\mu_n\Delta}$ pertaining to the true array as the dithered coefficients. The actual array coefficients are also dithered similarly and relations similar to (2) and (3) hold for $\hat{a}_n$ and $\hat{\Psi}_n$. The dithered fields due to the true array and the actual array are assumed to be observed at a near field sensor as shown in FIG. 1. These dithered fields are identified with a subscript d on H and $\hat{H}$.

Noise Free Case

We first consider the ideal situation of a receiver with no noise. An error signal $\epsilon$ based on the dithered signals is defined in equation 8, where a superscript * denotes complex conjugation. The error signal will be a quadratic function of the array coefficients as can be easily verified by evaluating the quantities in equations 9 and 10, where $\{\bullet\}$ is a notation for the mn th element of a matrix and equation 11 follows.

Substituting these expressions, the error signal can be expressed as in equation 12, and where equation 13 follows. Letting an $\hat{c}_n=c_n+e_n$, the mn th element of $D_\epsilon$ can be written as in equation 14. Thus the error matrix is strictly convex in the variables $\hat{c}_n$ and gradient based algorithms are naturally suited for reducing the error starting from an arbitrary initial point. The quantities $\beta_0$ and $\beta_1$ are both positive with $\beta_1 \leqq \beta_0$. Note that bold letters are used to indicate both vectors and matrices and the dot product in (12) is assumed to apply over vector quantities. Evidently, the matrix $D_\epsilon$ is Hermitian.

Another convenient form for $D_\epsilon$ is to write it as in equation 15, where diag($x_n$) is an N×N diagonal matrix with elements $x_n$, n=1, . . . , N along its principal diagonal and the superscript † represents Hermitian conjugate. With no dithering (i.e., with $\beta_0=\beta_1=1$), the matrix $D_\epsilon$ is simply seen to be $(\hat{c}-c)(\hat{c}-c)^\dagger$. In the noise-free case, the fields $\hat{H}_d=H_d$ if $\hat{c}_n=c_n$, n=1, . . . , N; consequently the error signal $\epsilon=0$ as can be clearly seen from (15). Hence the error signal will have a minimum at the true coefficients and a gradient based algorithm can be devised to nullify unwanted deviations.

We follow the spirit of the LMS (Least Mean Square) algorithm, which is based on minimizing the error signal. Such a minimization takes place when the coefficients are corrected in the direction of the gradients of the error signal with respect to the actual coefficients. Accordingly, we suppose the coefficients $\hat{c}_j^{(k+1)}$ at iteration (k+1) to be related to the coefficients $\hat{c}_j^{(k)}$ at iteration k as in equation 16 for j=1, . . . , N, where $\gamma$ is a positive real number and equation 17 is a notation for a complete complex derivative. The relationship in equation 18 can then be derived.

Combining equations (12), (13) with (18), it is straightforward to see that equation 19 follows, where $\delta_n^j$ is Kronecker's delta. The correction term in (16) is then proportional to equation 20, where $\hat{h}_{oj}=\hat{c}_{oj}g_j$ is the jth component of $H_d$ with $c=c_o\equiv 1$. Thus the algorithm needs all states of the total component of the dithered field of the actual array at the sensor (i.e., complex signals received at the sensor arising from all combinations of the dithered magnitudes and phases of the drive currents) as well as all the states of the individual element fields of the true array. The latter can be generated once a priori in a controlled environment and then stored in memory. The parameter $\gamma$ has to be chosen appropriately so that the iterations do not diverge. To investigate this further, it is more convenient to look at the correction vector $y^{(k)}=\hat{c}^{(k)}-c$. From (16) and (19), equation 21 is clear, where equation 22 follows.

The elements of the Hermitian matrix A are seen to depend only on the dithering statistics, the free-space fields of the various elements, and the coefficients of the true array. Further, it is evident from (22) that A is also positive definite. Hence its eigenvalues are all real and positive. Equation (22) is yet another form suitable for practical implementation of the dithering algorithm. In a matrix form, equation (21) reads as equation 23, where I is an identity matrix of order N. In order for the system in (23) to converge as $k\rightarrow\infty$, we need $|1-\gamma\zeta_{max}|<1$, where $\zeta_{max}$ is the largest eigenvalue of the matrix A. This requirement then implies equation 24. When this criterion for y is met, the actual coefficients converge exponentially to the true values as the iteration progresses.

Receiver with White Gaussian Noise

The presence of receiver noise can have an impact on the effectiveness of the algorithm. To investigate this, we consider (as one example only) additive white Gaussian noise corrupting the actual signal. For ease of analysis, we treat the noise as if it originates in the array and received at the noise-free near-field sensor through the array coefficients. The noise considered here is assumed to be (i) zero mean, (ii) independent of the dithering process, and (iii) independent from element to element of the array. Furthermore, the noise fluctuations are assumed to take place much more rapidly than the dithering process. Consequently, the averaging times involved in carrying out the expectations of the noise processes are much shorter than those involving the dithering process. We shall use a symbol E to denote expectation with respect to the white noise. The actual received signal is now written as $\overline{\hat{H}}_d=(g'+\hat{\theta}')\hat{c}_d=\hat{H}_d+\hat{c}'_d\hat{\theta}$, where $\hat{\theta}$ is a complex-Gaussian noise vector generated at the array. Like the Green's function g, it will have x- and y-components and each entry of the column vector of the components is assumed to have a variance $\tilde{\sigma}^2$. Likewise the true signal is assumed to be corrupted by noise to result in $\overline{H}_d=H_d+c'_d\theta$. Note the corrupting noise for the actual and true received signals is distinguished by the presence of hat on the former. However, they will have the identical statistics. Further note that the difference signal $\overline{\hat{H}}_d a-\overline{H}_d$ will have a noise floor even when $\hat{c}_n=c_n$, n=1, . . . , N.

The error signal in this case is shown in equation 25, where we have used the fact that the expectation operator E operates only on the noise related quantities and that $E(\theta)=0$, $E(\hat{\theta}\cdot\theta^\dagger)=0$, and $E(\theta\cdot\theta^\dagger)=E(\hat{\theta}\cdot\hat{\theta}^\dagger)=2\tilde{\sigma}^2 I$, where $2\tilde{\sigma}^2$ is the noise power generated at each antenna element. The factor of 2 arises in the noise power because both the x- and y-components of $\theta$ contribute to it. From (25) it is clear that the component of the gradient with respect to $\hat{c}_n^*$ is as shown in equation 26. Note that, in contrast to the noise-free case, the error signal and its gradient do not vanish when $\hat{c}_n=c_n$, n=1, . . . , N. The gradient will, instead, vanish at another point in the variable space that is determined by the amount of noise power.

As with the noise-free cage, we write iteration equations 27 and 28 for the array coefficients and their corresponding correction terms. In a matrix form, equation 28 can be written as equation 29, where equation 30 follows. In the limit as $k\rightarrow\infty$, one gets equation 31 if $\bar{\gamma}$ is chosen such that $|1-\bar{\gamma}(2\tilde{\sigma}^2\beta_o+\zeta_{max})|<1$, where, as before, $\zeta_{max}$ is the largest eigenvalue of the matrix A. Thus the actual array coefficients do not converge to the true coefficients, but instead to $\hat{c}=c+y^{(\infty)}$. At these coefficients, the error signal $\bar{\epsilon}$ will have zero gradients.

In order to assess the effect of noise quantitatively and to estimate its influence on the rate of convergence of the coefficients on the iterative procedure (28), we first need to define the signal power and the related signal to noise ratio. Using the representation shown in (15) and the definition of the matrix elements in (22), it can be shown that the mean signal power of the actual array is $\langle \hat{H}_d \cdot \hat{H}_d^* \rangle = \hat{c}^\dagger A \hat{c}$. Furthermore it is clear from (25) that the noise power in the receiver when the actual signal is measured is equal to $2\tilde{\sigma}^2 \beta_o \hat{c}^\dagger \hat{c}$. Observing that both powers contain the common pre- and post multiplicative factors of the form $\hat{c}^\dagger(\bullet)\hat{c}$, we define the signal power, S, as $\|A\|_2$, where $\|X\|_2$ of a square matrix X denotes its Euclidean norm and is equal to its largest eigenvalue, and the noise power $N_{no} = 2\tilde{\sigma}^2\beta_o$. Hence $S = \zeta_{max}$ and the signal-noise ratio $1/\chi = \zeta_{max}/2\hat{\sigma}^2\beta_o$, where we denote by $\chi$ the noise-to-signal ratio. From (31), (32) follows, where $\zeta_{min}$ is the smallest eigenvalue of A and the second inequality follows from the definition of $l_2$ norm $\lambda \bullet \lambda_2$. Therefore the limiting value of the fractional residual error is upper bounded by the relationship shown in equation 33, where $\kappa_A = \zeta_{max}/\zeta_{min}$ is the condition number of the matrix A. The two terms in (29) offer competing trends—the first term decreases, while the second term increases as k increases. Hence for sufficiently large signal-to-noise ratios, we expect the fractional residual error to first decrease, but eventually increase as the iteration in (29) progresses. It is to be noted from (33) that the convergence of the algorithm is strongly dependent on the condition number of the matrix in addition to the signal to noise ratio.

Exemplary Numerical Results

Figure 2:
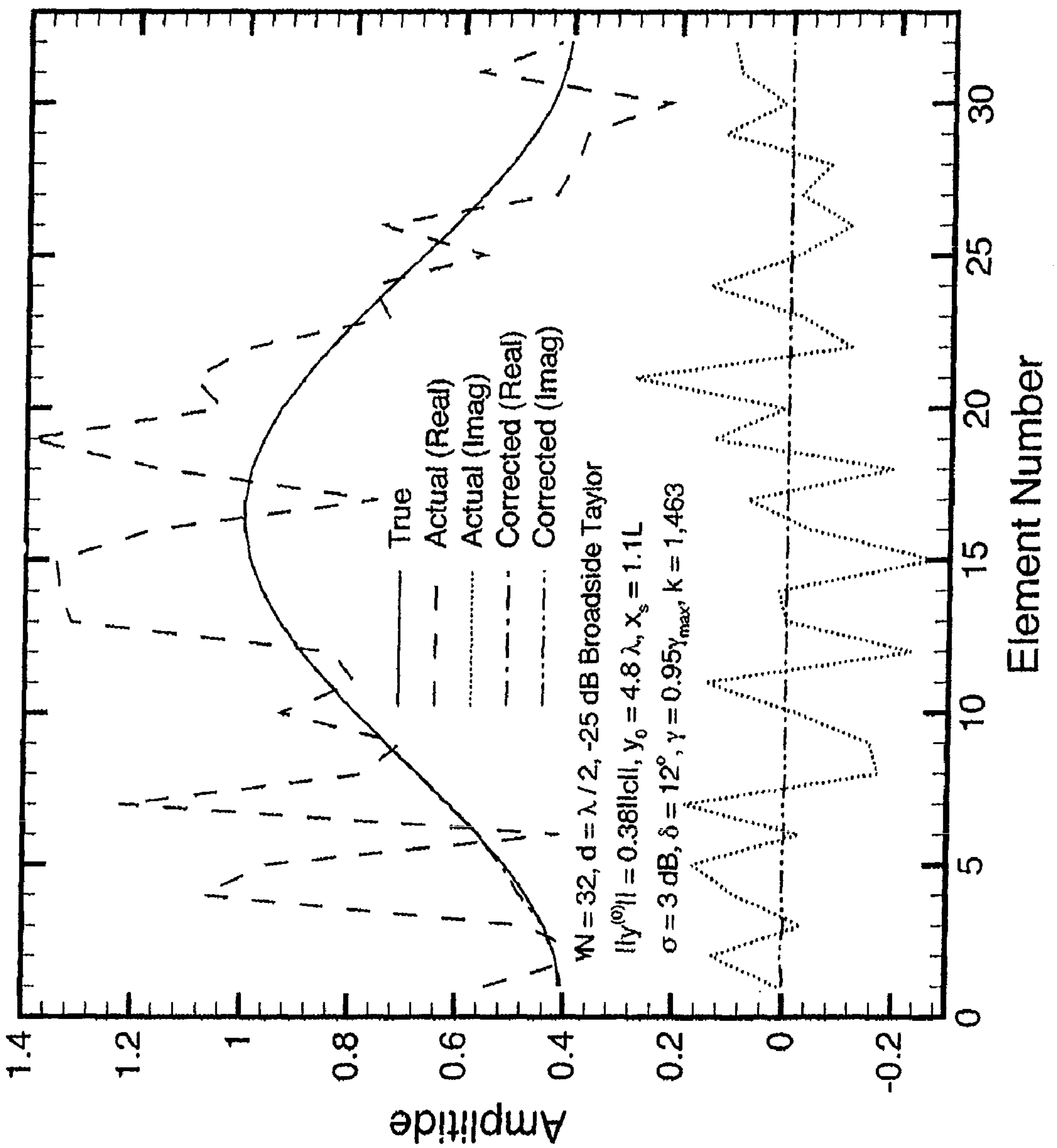
FIG. 2 is a graph of the true, actual and corrected array amplitudes for one example of the invention.
Figure 3:
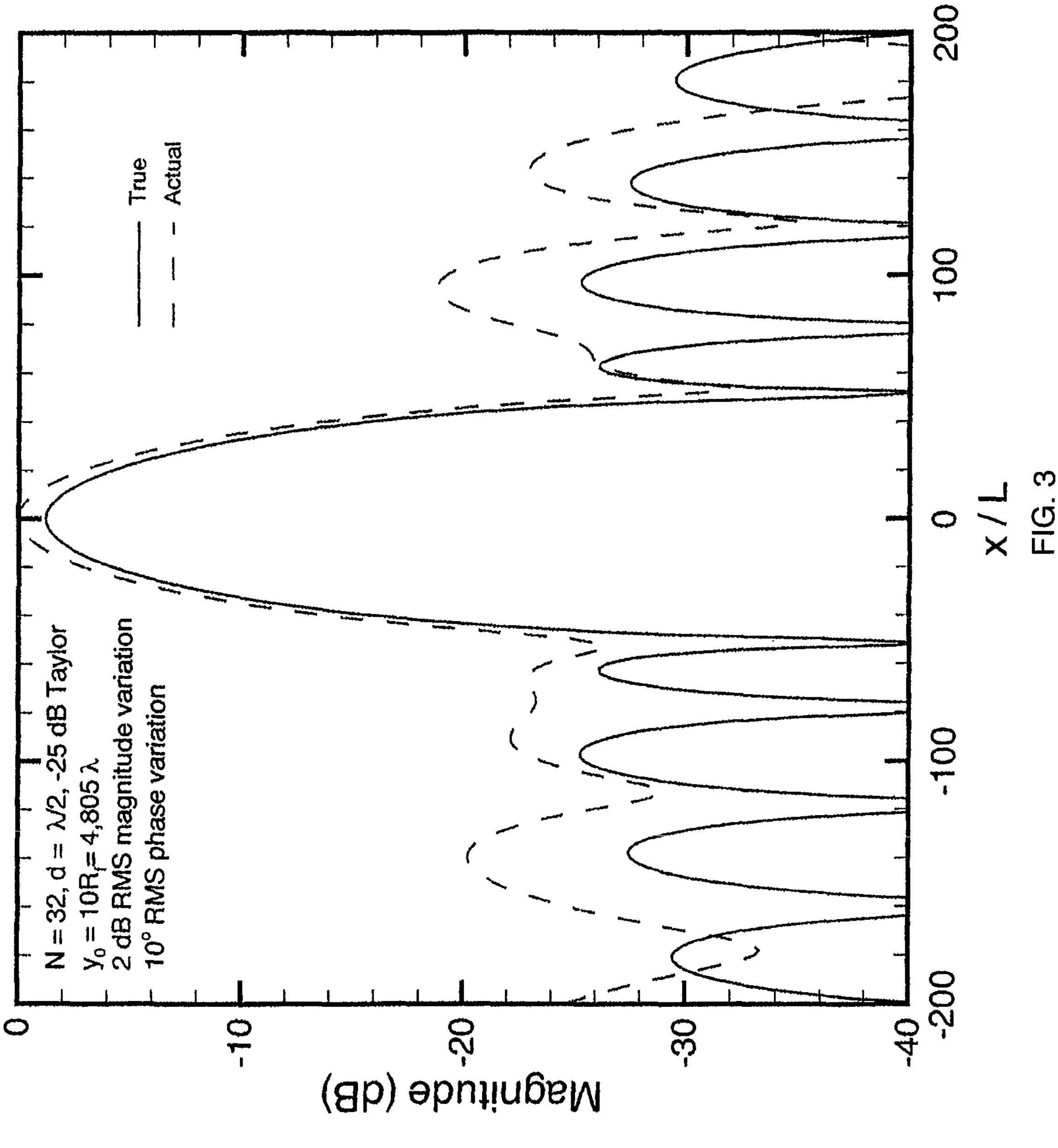
FIG. 3 is a graph of the true and actual far-zone magnetic fields of a linear array used to illustrate the invention. A broadside, −25 dB sidelobe Taylor array comprised of Hertzian dipoles is assumed.

Results are presented below for a −25 dB sidelobe, broadside Taylor array with 32 elements as a non-limiting demonstration of the invention. The inter-element spacing is chosen to be $0.5\lambda$. The total length of the array is $2L = 15.5\lambda$ and the minimum far-zone distance $R_f = 8L^2/\lambda = 480.5\lambda$. The aperture distribution, $a_n$, versus element number is shown in FIG. 2 as a solid line. For the purpose of illustration, we perturb the true coefficients randomly with the magnitude varied on a dB scale using Gaussian fluctuations with an RMS (Root Mean Square) deviation of 2 dB and the phase varied uniformly with an RMS deviation of 10°. The real and imaginary parts of the actual coefficients are also shown in FIG. 2 as dashed lines. The far-zone magnetic field strength for the true and actual array is shown in FIG. 3 as a function of lateral displacement x for $y = 10R_f$ and $z = 0$. Clearly, the sidelobes have increased substantially and the mainlobe slightly broadened as a result of the fluctuations introduced. The actual array has a sidelobe level in excess of −20 dB, whereas the true array has a value of −25 dB.

Figure 4A:
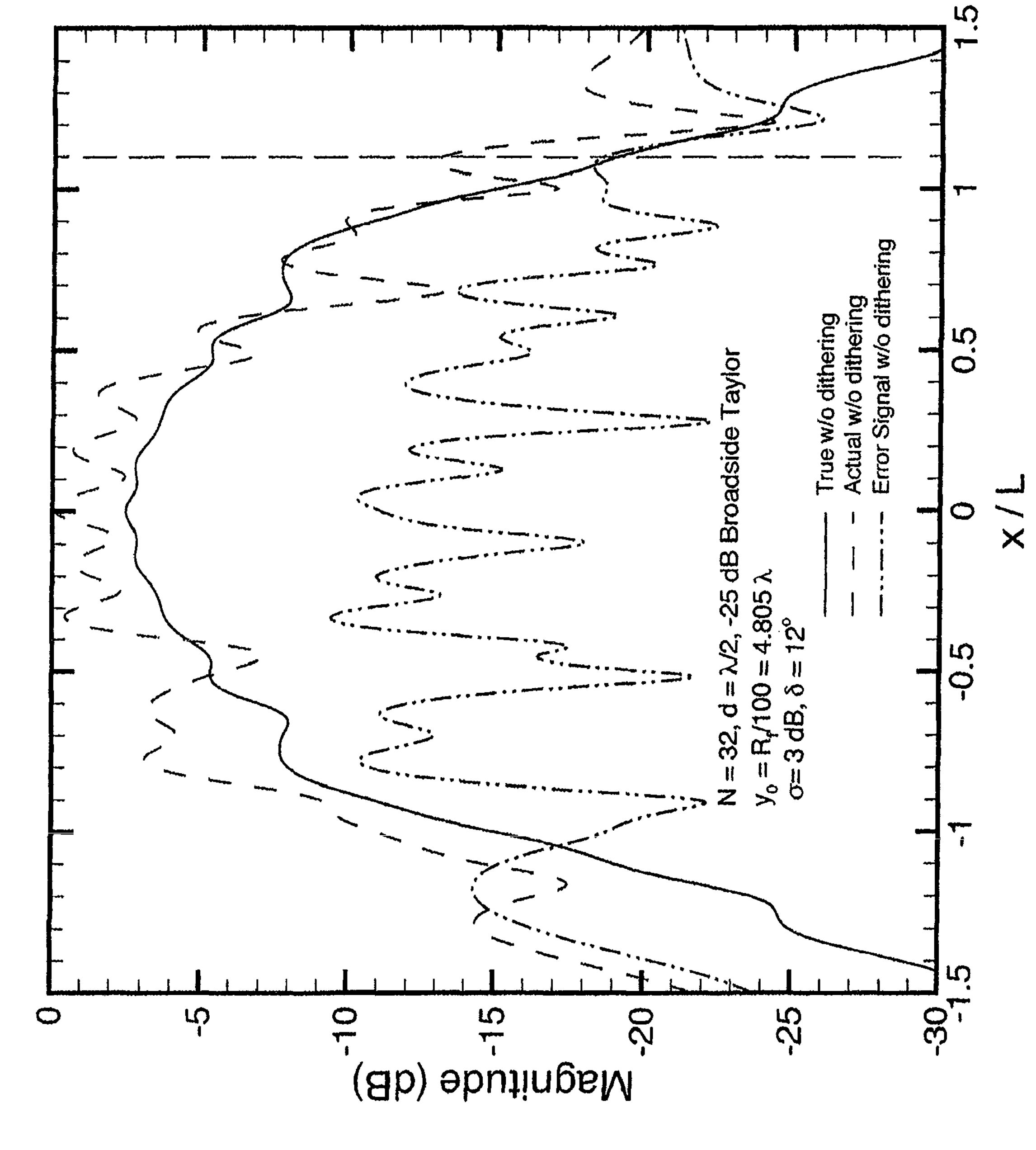
FIGS. 4*a* and 4*b* are graphs of the magnetic fields at a near-zone sensor, with (a) and without (b) dithering. The location of the near-field sensor is indicated by the dashed vertical line.
Figure 4B:
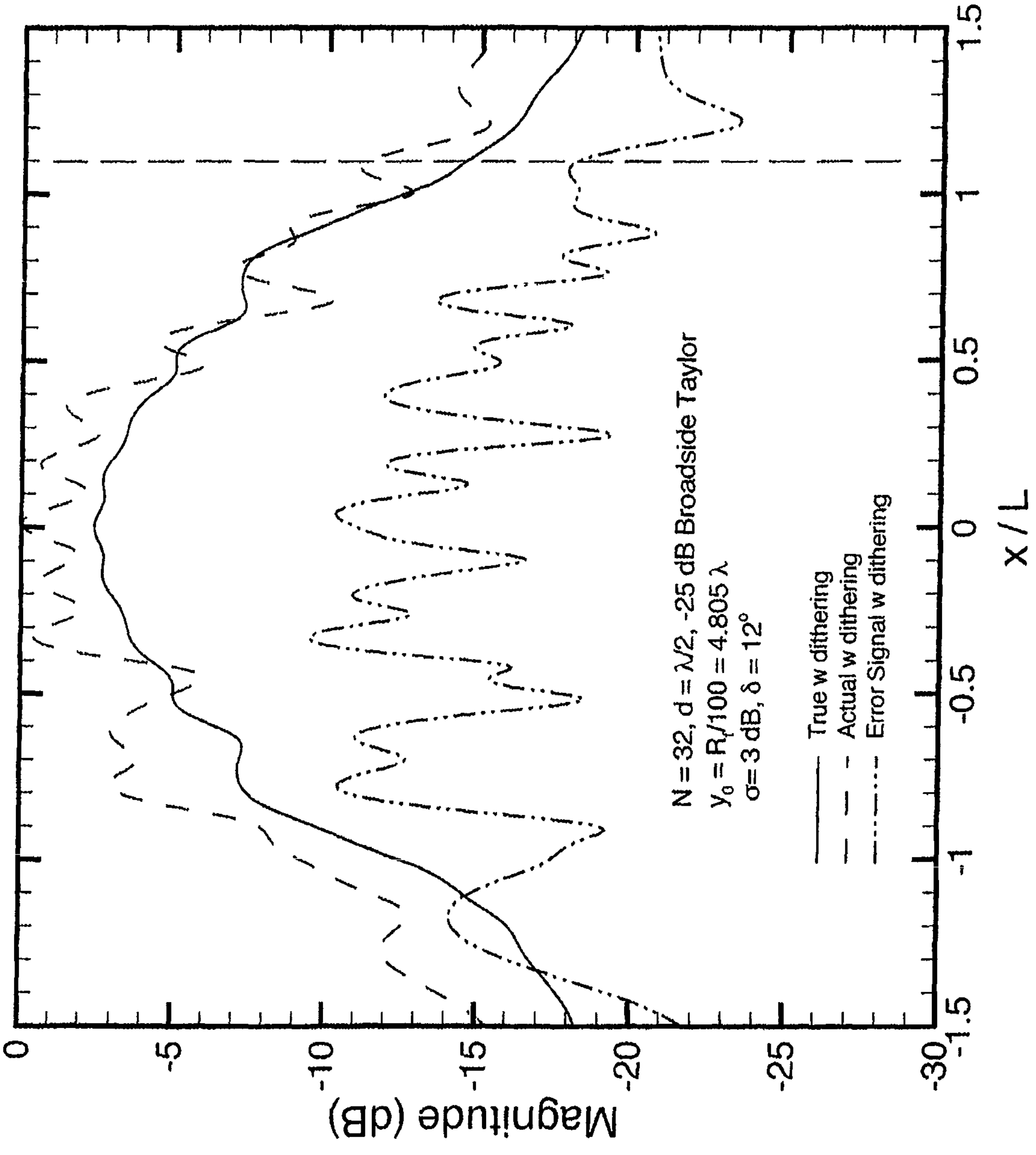

A near-field sensor is assumed to be located in the $z=0$ plane at $x = x_s = 1.1L$ and $y = y_0 = R_f/100 = 4.805\lambda$. The true and actual coefficients are dithered using $\sigma = 3$ dB and $\delta = 12°$. The actual and true near fields with and without dithering are shown in FIG. 4. One effect of dithering is to raise the field levels in both the actual and true arrays and decrease the dynamic range of the signal variation. In a sense, dithering induces some spatial correlation of field fluctuation. The above choice of parameters results in $\beta_0 = 1.2695$ and $\beta_1 = 1.0781$ and $\zeta_{max} = 18.872$, $\kappa_A = 708$. The maximum value of $\gamma$ as per equation (24) is calculated to be $\gamma_{max} = 0.106$ and a value of $\gamma = 0.95\gamma_{max}$ was used to run the algorithm (22). The algorithm was terminated when $\|y^{(k)}\|_2$ reached 0.2% of $\|c\|_2$. In practice, the algorithm may be terminated by considering errors in successive iterations. The initial 2-norm of the residual error was $\|y^{(0)}\|_2 = 0.38\|c\|_2$. The algorithm converged in k=1,463 iterations and the converged solution is also shown in FIG. 2 as a dashed-dot line. The converged coefficients are virtually indistinguishable from the true coefficients.

Figure 5:
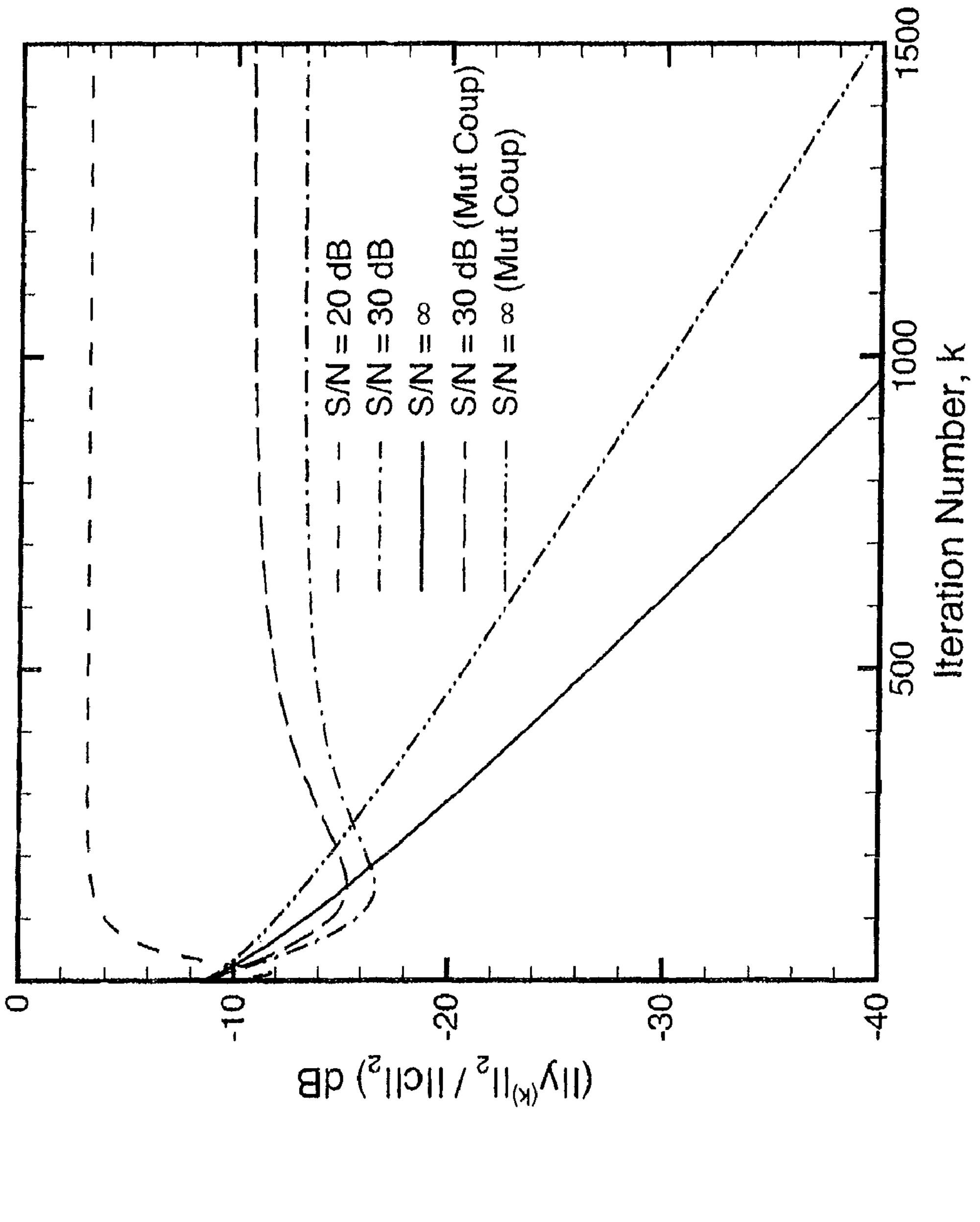
FIG. 5 is a graph of the residual error as a function of iteration number for various signal to noise ratios for the exemplary −25 dB broadside Taylor array. Other parameters chosen are $y_0=4.8\lambda$, $x_s=1.1$ L, 2 L$=15.5\lambda$, $\sigma=3$ dB and $\delta=12°$.

FIG. 5 shows the effect of signal-to-noise ratio (SNR) on the residual error. The residual error for the noise-free case decreases exponentially with the iteration number k, while it saturates to a finite value for the noisy case. The 30 dB SNR exhibits the situation where the benefits of large iteration number are felt initially, but only to be overwhelmed by increasing contributions due to the noise term for large k. The residual error is around −13.2 dB. It is seen that for this case, there is no benefit of increasing the number of iterations beyond about 500.

Figure 6:
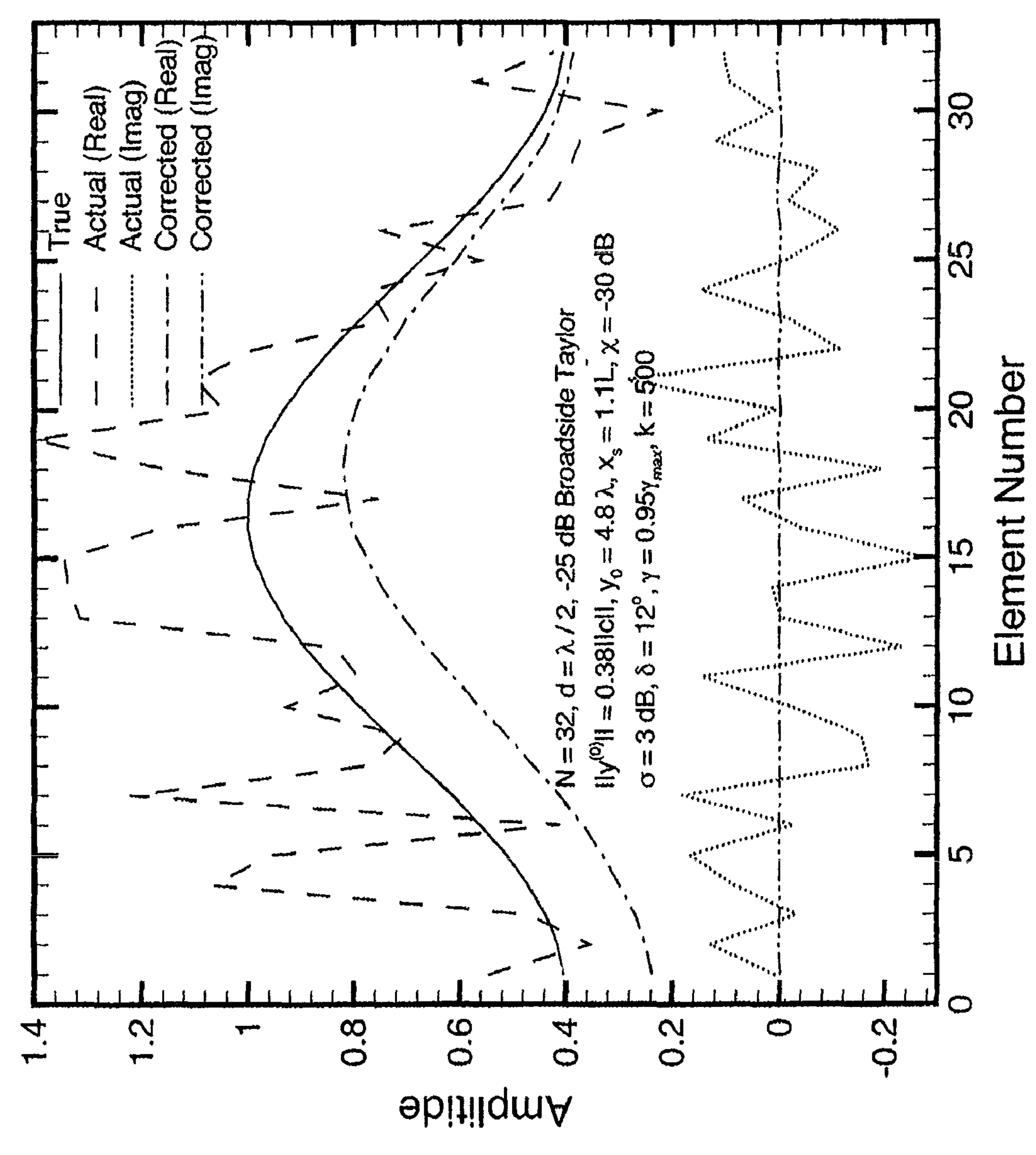
FIG. 6 is a graph of the true, actual and corrected array amplitudes for $\chi=-30$ dB. $\sigma=3$ dB, $\delta=12°$, and $y_0=4.8\lambda$.

The corrected coefficients along with the true and the actual coefficients are shown in FIG. 6. It is seen that the phase has been recovered very well, but the magnitudes have not converged to the true solution, even though the huge excursions present in the actual coefficients have been significantly reduced as a result of the dithering algorithm. Not surprisingly, the agreement is better for those elements of the array that are closer to the sensor. This may suggest a more symmetric placement of sensors than the one deployed here. Thus, the invention contemplates one or more near-field sensors placed in desired locations; the quantity and locations of the near-field sensors can be readily determined by one of skill in the field to accomplish a desired antenna element coefficient correction result.

Figure 7:
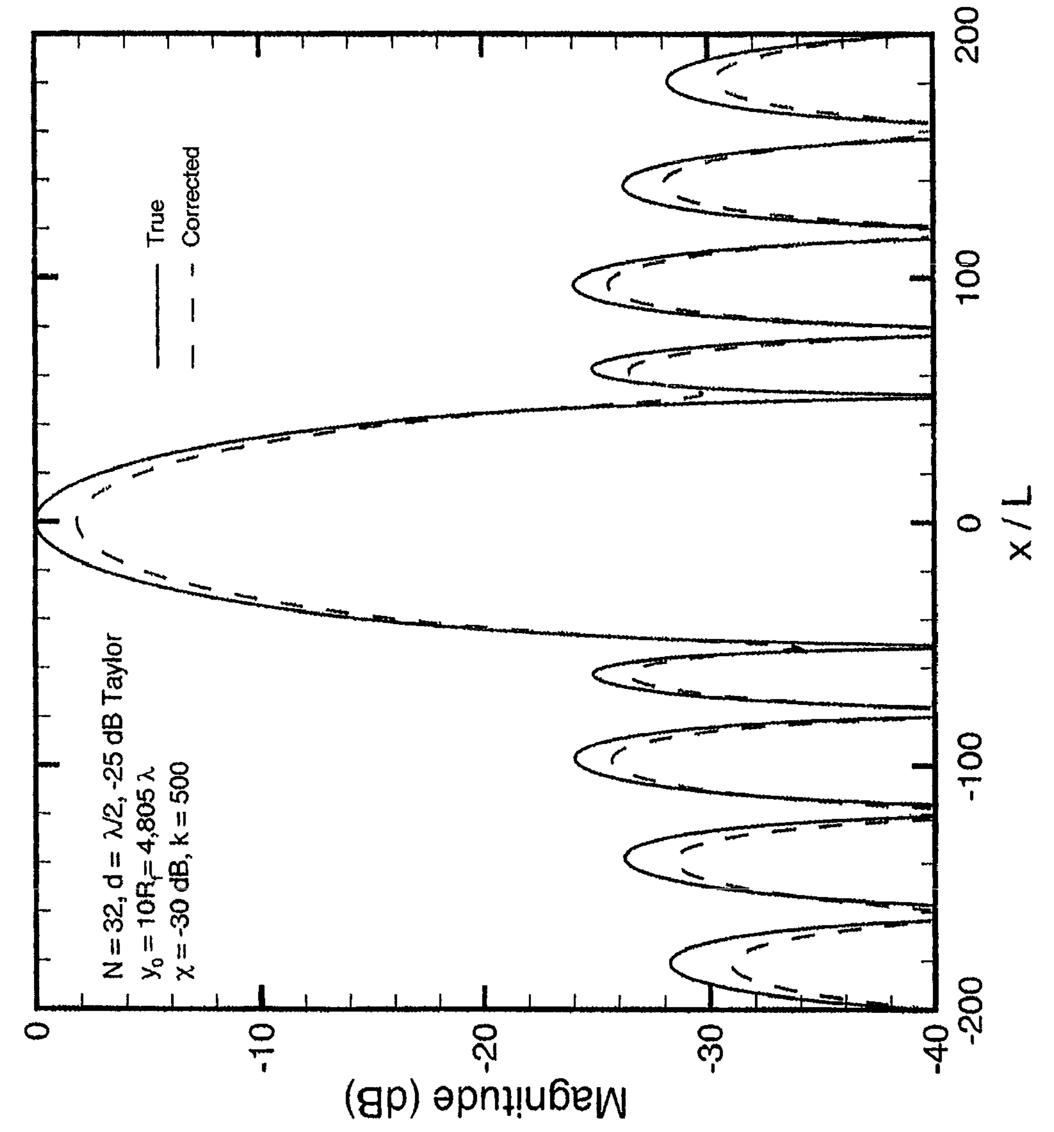
FIG. 7 is a graph of the true and corrected far-zone patterns for $\chi=-30$ dB, $\sigma=3$ dB, $\delta=12°$, and $y_0=4.8\lambda$.

The corresponding far-zone pattern for the corrected coefficients is compared in FIG. 7 with the true pattern. By comparing with FIG. 3, it is seen that the even though the array coefficients have not been fully corrected, the sidelobes in the actual array have been lowered significantly by the dithering algorithm. The corrected and actual arrays have a sidelobe level of −24 dB and −20 dB respectively.

Figure 8:
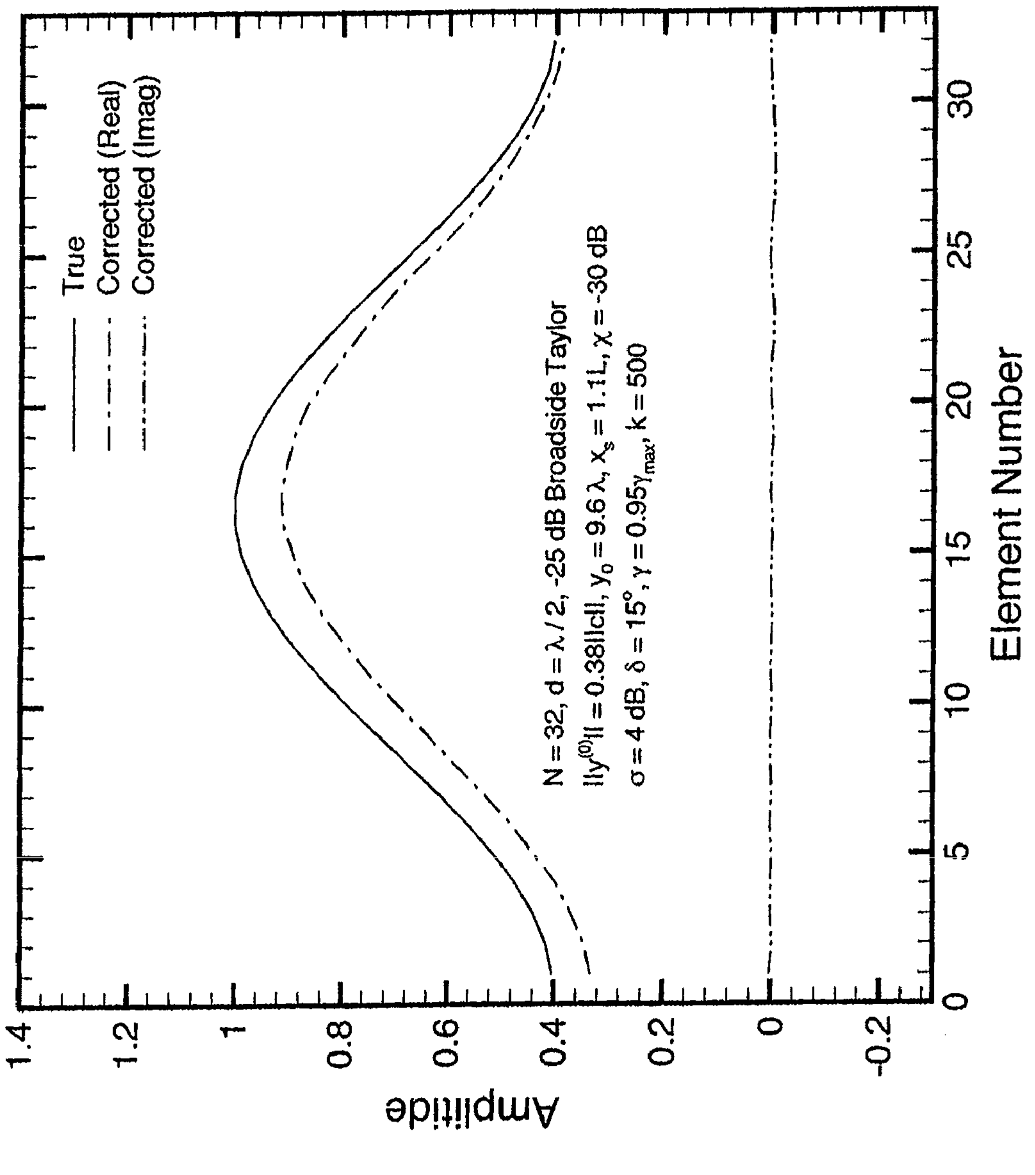
FIG. 8 is a graph of the true and corrected array amplitudes for $\chi=-30$ dB $\sigma=4$ dB, $\delta=15°$, and $y_0=9.6\lambda$.
Figure 9:
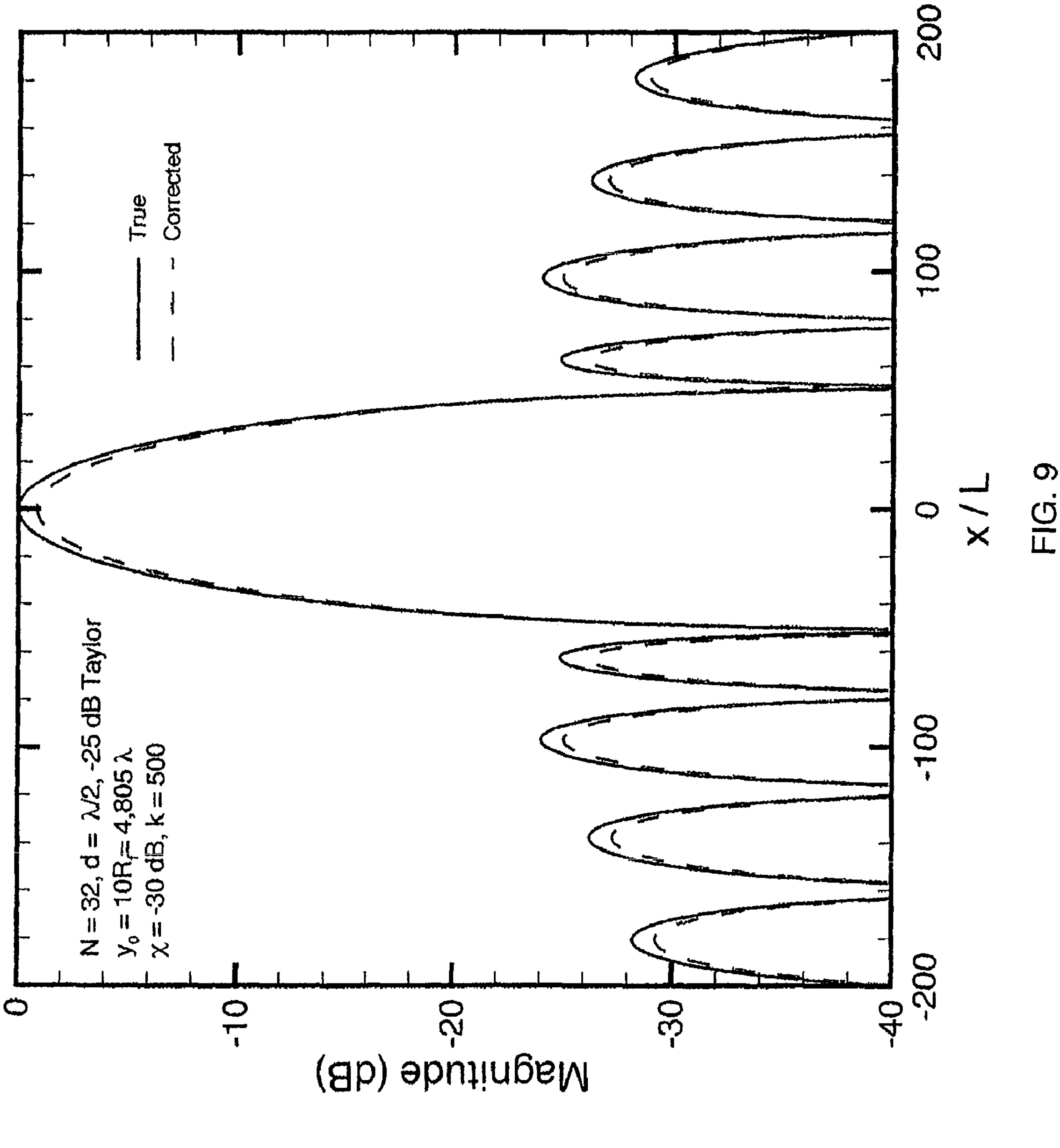
FIG. 9 is a graph of the true and corrected far-zone patterns for $\chi=-30$ dB with $\sigma=4$ dB, $\delta=15°$, and $y_0=9.6\lambda$.

The convergence rate and the residual error of the algorithm depends on the dithering parameters $\sigma$ and $\Delta$. In general, larger values of $\sigma$ and $\Delta$ result in faster convergence with lower residual error. Conversely, the algorithm did not converge at all for no dithering ($\sigma = 0 = \Delta$). The convergence rate also depended on the choice of $y_0$, with faster convergence achieved for larger $y_0$. For the SNR of 30 dB example considered above, the residual error after 500 iterations is decreased to −20 dB when dithering was performed with $\sigma = 4$ dB $\delta = 15°$, and $y_0 = 9.6\lambda$, all other parameters remaining constant. The estimate for the upper bound in the residual error provided by (33) is −15 dB. The corrected coefficients and the corresponding far-zone patterns are shown in FIG. 8 and FIG. 9 respectively. It is seen that the dithering algorithm has performed much better when compared to the values considered in FIG. 6. The condition number of the matrix A is reduced to 209 for the parameters chosen here as opposed to a value 708 for the parameters chosen in FIG. 6. Hence for the same SNR, the algorithm performs better here.

To gain a perspective into the kind of powers involved and the order of the SNRs achievable, let us consider some practical numbers. Assume that the near field sensor has a field coupling factor of p, $0 < p \leqq 1$ (the sensor couples the field $p|\hat{H}|$). For an antenna current of $I_o$ mA, the signal power received in the sensor is $S = I_o^2 p^2 10^{-6} \zeta_{max}/16\pi^2 = 6.33 I_o^2 p^2 \zeta_{max} \times 10^{-9}$, where we have included back the factor $I_o/4\pi$ that was made equal to unity in the analysis. Assuming thermal noise in the receiver and a receiver noise figure of F, the available noise power in a receiver bandwidth of $B_o$ is $N_{no} = 2\beta_o\tilde{\sigma}^2 = 2\rho_o k_B T B_o F$, where $k_B$ is the Boltzman's constant. For some realistic values of $F=10$, $p^2=0.1$, $T=290°$ K, $I_o=1$, $B_o=1$ MHz, the signal and noise powers are $S = 6.33\zeta_{max} \times 10^{-10}$ W, $N_{no} = -104 + 10\log(2\beta_o)$ dBm. Using $\beta_o = 1.2695$ and $\zeta_{max} = 18.872$ for the parameters considered in FIG. 2, we get an SNR of 50.7 dB for every mA of the drive current on the dipoles. The SNR of 30 dB assumed in FIG. 6 is very pessimistic in this sense.

Figure 10A:
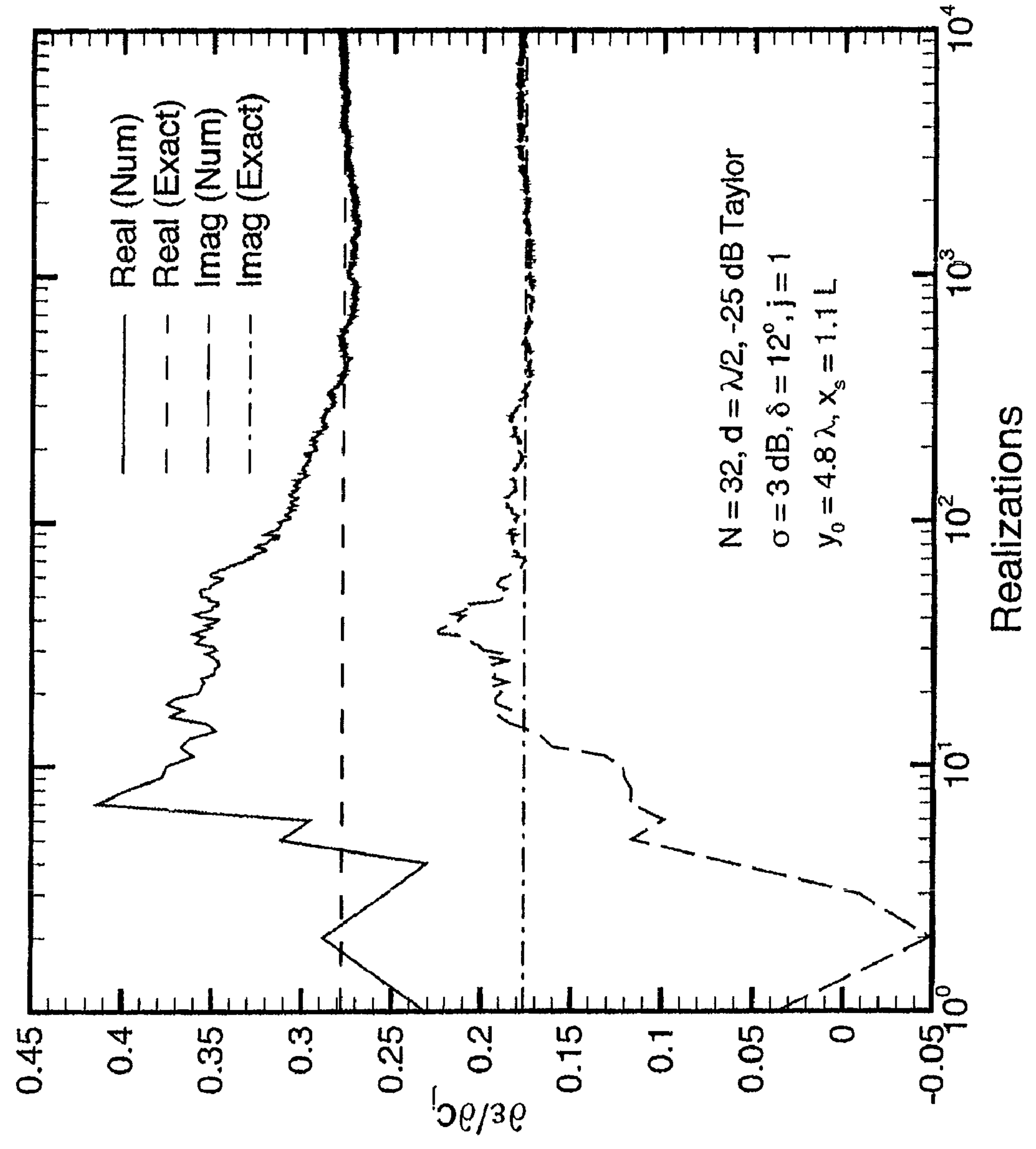
FIGS. 10*a* and 10*b* are graphs illustrating an implementation of the error gradient $$\frac{\partial \varepsilon}{\partial \hat{c}_j}$$
Figure 10B:
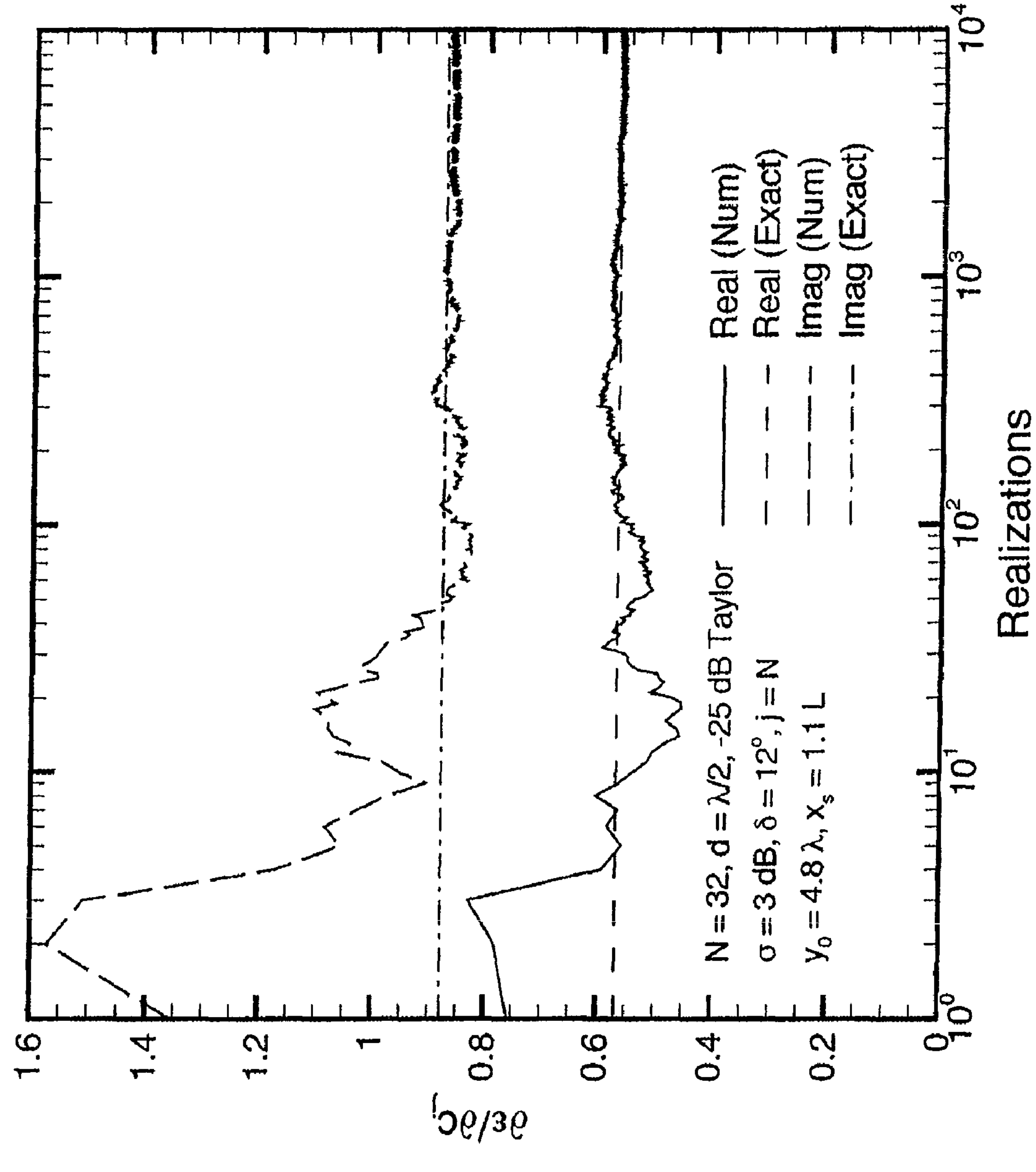

The error gradient used in all of the plots shown thus far was obtained analytically in terms of the matrix A. In practical arrays, it may be desirable to implement the ensemble mean in expression (20) by means of Monte Carlo averaging. FIG. 10 shows the behavior of the gradient $\partial\epsilon/\partial\hat{c}^*_j$ with respect to the number of realizations used in the averaging process. Results are shown for the first and the last element of the array. It appears that reasonable results could be obtained using about one thousand realizations. In general, more realizations are need for stronger dithering (larger $\sigma$ and/or larger $\Delta$), which partially offsets the advantage offered by needing fewer number of iterations in the correction process.

When the error minimization process was carried out with no dithering, the algorithm did not correct for the amplitudes at all. This shows that dithering leads to coefficient correction. A spectral analysis of the matrix A revealed that its largest eigenvalue of $\zeta_{max}$=17.3 remained roughly the same as with dithering. However, the condition number of the matrix jumped to $\kappa_A=10^{18}$ from its dithered value of 708. Hence from a purely numerical standpoint, dithering has the effect of clustering the eigenvalues, thereby making more degrees of freedom available to the minimization procedure, and making it more immune to noise fluctuations. A second version of the algorithm was attempted with an error function defined as $\epsilon_2=(\langle\hat{H}\cdot\hat{H}\rangle\cdot-\langle H\cdot H^*\rangle\cdot)^2$, which would require the storage of fewer field quantities. However, the algorithm did not converge at all.

FIG. 11 is a simplified schematic block diagram of a system for the invention, which can also be used to accomplish the method of the invention. System 10 comprises acoustic or electromagnetic array antenna 12 that is driven by array element drivers 18 under control of processor (with appropriate memory) 16. Near-field sensor or sensors 14 are located in close proximity to antenna 12. In practical implementations, the sensor is placed at any convenient location where the signal can be measured without causing too much physical blockage to the antenna aperture. Sensor(s) 14 detect the field emanating from antenna 12 and supply one or more signals indicative of the field to processor 16. Processor 16 implements the algorithms set forth above to alter the array element drive currents produced by drivers 18, to move the actual field closer to the true (or desired) field.

The radiation pattern of an antenna is the same whether it is used in the transmit or the receive mode. This follows from electromagnetic reciprocity principle. Hence the invention is applicable to both receive and transmit arrays. Since the correction technique relies on transmission and near-field sensing, when the invention is used for reception the array would need to periodically be switched to transmit for sufficient time for the necessary corrections to be determined. A better option may be to replace the near-field sensor with a corresponding near-field transmitting antenna and let the array operate directly in the receive mode. The signal in this case would be the output of the array, which is a linear function of the coefficients. The equations for this reciprocal problem would remain the same as above and the array calibration could be performed in the same manner.

Conclusions

An algorithm for automatically tracking the desired performance of an antenna array by dithering its coefficients and observing its field in the near-zone has been demonstrated by considering a uniform linear array comprised of Hertzian dipoles. An LMS type algorithm has been presented for correcting for the coefficients both in a noise-free and noisy environments. The robustness of the algorithm has been demonstrated by considering a realistic low-sidelobe, broadside array whose array coefficients experienced 2 dB RMS magnitude fluctuations and 10° RMS phase fluctuations. Assuming that one needs 1,000 iterations for the algorithm to converge and 1,000 realizations per iteration to carry out the expectation, we estimate that the current algorithm would be able to track changes in the coefficients that vary at most at a rate of 1 Hz if the time per iteration is taken as 1 ms and the time per realization during the expectation operation is taken as 1 μs. This is but one example of the invention but in no way limits the scope of the claims.

EQUATIONS $$H = \frac{I_o}{4\pi}\sum_{n=1}^{N} c_n \frac{y\hat{x} - (x - x_n)\hat{y}}{R_n^2}\left(ik_0 - \frac{1}{R_n}\right)e^{ik_o R_n} = \frac{I_o}{4\pi}g' c, \tag{1}$$

$$\tilde{a}_n = a_n e^{\alpha\gamma_n}, \quad \alpha = 0.05\ln(10)\sigma \tag{2}$$

$$\tilde{\psi}_n = \psi_n + \mu_n\Delta, \tag{3}$$

$$\delta^2 = \left\langle(\tilde{\psi}_n - \psi_n)^2\right\rangle = \Delta^2\langle\mu_n^2\rangle = \Delta^2\int_{-1}^{1}\frac{1}{2}\mu_n^2 d\mu_n = \frac{\Delta^2}{3}. \tag{4}$$

$$\langle e^{i\mu_n\Delta}\rangle = \frac{\sin\Delta}{\Delta} \tag{5}$$

$$\langle\tilde{a}_n\rangle = \langle e^{\alpha\gamma_n}\rangle a_n = e^{\alpha^2/2}a_n \tag{6}$$

$$\langle\tilde{a}_n^2\rangle = e^{2\alpha^2}a_n^2. \tag{7}$$

$$\epsilon = \left\langle\left(\hat{H}_d - H_d\right)\cdot\left(\hat{H}_d - H_d\right)^*\right\rangle, \tag{8}$$

$$\langle H_d\cdot H_d^*\rangle = g'\cdot\{c_m c_n^*\langle e^{\alpha\gamma_m}e^{\alpha\gamma_n}e^{i\Delta(\mu_m-\mu_n)}\rangle\}g^* = g'\cdot\{c_m c_n^*\beta_{mn}\}g^* \tag{9}$$

$$\left\langle H_d\cdot\hat{H}_d^*\right\rangle = g'\cdot\{c_m\hat{c}_n^*\beta_{mn}\}g^*, \tag{10}$$

$$\beta_{mn} = \begin{cases} e^{2\alpha^2} \equiv \beta_0, & \text{if } m = n; \\ e^{\alpha^2}\left(\frac{\sin\Delta}{\Delta}\right)^2 \equiv \beta_1, & \text{if } m \neq n. \end{cases} \tag{11}$$

$$\epsilon = g'\cdot D_\epsilon g^*, \tag{12}$$

where $$\{D_\epsilon\}_{mn} = \beta_{mn}(\hat{c}_m\hat{c}_n^* + c_m c_n^* - \hat{c}_m c_n^* - c_m\hat{c}_n^*). \tag{13}$$

$$\{D_\epsilon\}_{mn} = \beta_{mn}e_m e_n^* = \beta_{mn}(-e_m)(-e_n^*). \tag{14}$$

$$D_\epsilon = \beta_1(\hat{c} - c)(\hat{c} - c)^\dagger + (\beta_0 - \beta_1)\text{diag}\left(|\hat{c}_n|^2 + |c_n|^2 - \hat{c}_n c_n^* - c_n\hat{c}_n^*\right), \tag{15}$$

$$\hat{c}_j^{(k+1)} = \hat{c}_j^{(k)} - \gamma\left.\frac{\partial\epsilon}{\partial\hat{c}_j^*}\right|^{(k)} = \hat{c}_j^{(k)} - \gamma g'\cdot\left.\frac{\partial D_e}{\partial\hat{c}_j^*}\right|^{(k)} g^*, \tag{16}$$

$$\frac{\partial}{\partial\hat{c}_j^*} = \frac{1}{2}\left(\frac{\partial}{\partial\hat{r}_j} + i\frac{\partial}{\partial\hat{x}_j}\right), \quad \hat{c}_j = \hat{r}_j + i\hat{x}_j \tag{17}$$

$$\frac{\partial\hat{c}_j}{\partial\hat{c}_j^*} = 0, \quad \frac{\partial\hat{c}_j^*}{\partial\hat{c}_j^*} = 1. \tag{18}$$

$$\left.\frac{\partial D_\epsilon}{\partial\hat{c}_j^*}\right|^{(k)} = \left\{\delta_n^j\beta_{mj}\left(\hat{c}_m^{(k)} - c_m\right)\right\}, \tag{19}$$

-continued $$\left.\frac{\partial\epsilon}{\partial\hat{c}_j^*}\right|^{(k)} = g'\cdot\left\{\delta_n^j\beta_{mj}\left(\hat{c}_m^{(k)}-c_m\right)\right\}g^* = g'\cdot\left\{\left\langle\delta_n^j\left(\hat{c}_m^{(k)}-c_m\right)c_{oj}^*e^{\alpha\nu_m}e^{\alpha\nu_n}e^{i\Delta(\mu_m-\mu_n)}\right\rangle\right\}g^* = \left\langle\left(\hat{H}_d^{(k)}-H_d\right)\cdot\tilde{h}_{oj}^*\right\rangle, \quad (20)$$

$$y_j^{(k+1)} = y_j^{(k)} - \gamma\sum_{m=1}^{N}A_{jm}y_m^{(k)}, \quad j=1,\ldots,N. \quad (21)$$

where $$A_{jm} = \beta_{mj}g_m\cdot g_j^* \equiv \beta_{mj}g_m\cdot h_{oj}^* = A_{mj}^*. \quad (22)$$

$$y^{(k+1)} = (I-\gamma A)y^{(k)} = (I-\gamma A)^{k+1}y^{(0)}, \quad (23)$$

$$\gamma < \frac{2}{\zeta_{max}}. \quad (24)$$

$$\bar{\epsilon} = \left\langle\varepsilon\left[\left(\hat{\overline{H}}_d-\overline{H}_d\right)\cdot\left(\hat{\overline{H}}_d-\overline{H}_d\right)^*\right]\right\rangle = \epsilon + 2\tilde{\sigma}^2\left\langle\hat{c}_d^\dagger\hat{c}_d\right\rangle + 2\tilde{\sigma}^2\left\langle c_d^\dagger c_d\right\rangle = \epsilon + 2\tilde{\sigma}^2\beta_o\left(\hat{c}^\dagger\hat{c}+c^\dagger c\right), \quad (25)$$

$$\frac{\partial\bar{\epsilon}}{\partial\hat{c}_j^*} = \frac{\partial\epsilon}{\partial c_j^*} + 2\tilde{\sigma}^2\beta_o\hat{c}_j. \quad (26)$$

$$\hat{c}_j^{(k+1)} = \hat{c}_j^{(k)} - \overline{\gamma}\frac{\partial\bar{\epsilon}}{\partial\hat{c}_j^*} \quad (27)$$

$$y_j^{(k+1)} = y_j^{(k)} - \overline{\gamma}\sum_{m=1}^{N}A_{jm}y_j^{(k)} - 2\overline{\gamma}\tilde{\sigma}^2\beta_o\left(c_j+y_j^{(k)}\right). \quad (28)$$

$$y^{(k+1)} = By^{(k)} - 2\tilde{\sigma}^2\overline{\gamma}\beta_o c = B^{k+1}y^{(0)} - 2\tilde{\sigma}^2\overline{\gamma}\beta_o(I+B+\ldots+B^k)c, \quad (29)$$

$$B = (1-2\tilde{\sigma}^2\overline{\gamma}\beta_o)I - \overline{\gamma}A. \quad (30)$$

$$y^{(\infty)} = B^\infty y^{(0)} - 2\tilde{\sigma}^2\overline{\gamma}\beta_o(I-B)^{-1}c \to -2\tilde{\sigma}^2\overline{\gamma}\beta_o(I-B)^{-1}c = -2\tilde{\sigma}^2\beta_o[A+2\tilde{\sigma}^2\beta_o I]^{-1}c \quad (31)$$

$$\|y^{(\infty)}\| = 2\tilde{\sigma}^2\beta_o\left\|(A+2\tilde{\sigma}^2\beta_o I)^{-1}c\right\|_2 \le 2\tilde{\sigma}^2\beta_o\left\|(A+2\tilde{\sigma}^2\beta_o I)^{-1}\right\|_2\|c\|_2 = 2\tilde{\sigma}^2\beta_o(\zeta_{min}2\tilde{\sigma}^2\beta_o)^{-1}\|c\|_2, \quad (32)$$

$$\frac{\|y^{(\infty)}\|_2}{\|c\|_2} \le \frac{2\tilde{\sigma}^2\beta_o}{\zeta_{min}+2\tilde{\sigma}^2\beta_o} = \frac{\kappa_A}{\chi^{-1}+\kappa_A}, \quad (33)$$

Although specific features of the invention are shown in some drawings and not others, this is for convenience only as the features may be combined in other manners in accordance with the invention.

Other embodiments will occur to those skilled in the art and are within the following claims.

What is claimed is:

1. A method of adaptively correcting the excitation or receive coefficients for a phased array antenna that comprises a plurality of antenna elements, wherein the coefficients have a magnitude and phase, the method comprising:

locating one or more sensors or transmitting antennas in the near field of the phased array antenna, the sensor for sensing the phased array antenna transmission, and the transmitting antenna for transmitting a signal that is received by the phased array antenna;

determining a reference signal that represents either the sensor response to a desired phased array antenna transmission that is accomplished with predetermined excitation coefficients or the transmitting antenna transmission that results in a desired phased array antenna reception that would be accomplished with predetermined receive coefficients;

modifying the magnitudes and phases of the coefficients in a predetermined manner to create a modified phased array antenna transmission or reception, wherein the modifying step comprises modifying the coefficients for each element of the array and wherein the redetermined manner corn rises dithering the coefficients by independently fluctuating the magnitude and phase for each element of the array, wherein the fluctuations are independent from element to element;

determining an actual signal that represents either the sensor response to the modified transmission or the phased array antenna output with the modified coefficients; and simultaneously correcting the coefficients for all of the elements in a manner that is based on the reference signal and the actual signal, the correcting step comprising determining an error signal based on a complex conjugation of the difference between the actual signal and the reference signal and minimizing the error signal, such that either the modified phased array antenna transmission becomes closer to the desired transmission or the modified phased array antenna reception becomes closer to the desired reception.

2. The method of claim 1 in which the error signal is minimized using a gradient-based algorithm.

3. The method of claim 2 in which the algorithm uses all states of a total component of the modified antenna transmission at the sensor.

4. The method of claim 2 in which the algorithm uses all states of a total component of the modified phased array antenna reception.

5. The method of claim 1 in which the correcting step further comprises minimizing a gradient of the error signal.

6. The method of claim 1 in which the reference signal is predetermined and then stored in memory for use in the adaptive correction.

7. A system for adaptively correcting the excitation or receive coefficients for a phased array antenna that comprises a plurality of antenna elements, wherein the coefficients have a magnitude and phase, the system comprising:

one or more sensors or transmitting antennas located in the near field of the phased array antenna, the sensor sensing the phased array antenna transmission, and the transmitting antenna transmitting a signal that is received by the phased array antenna;

a memory that stores a reference signal that represents either the sensor response to a desired phased array antenna transmission that is accomplished with predetermined excitation coefficients or the transmitting antenna transmission that results in a desired phased array antenna reception that would be accomplished with predetermined receive coefficients; and a processor that:

modifies the magnitudes and phases of the coefficients in a predetermined manner to create a modified phased array antenna transmission or reception, wherein the modification comprises modifying the coefficients for each element of the array and wherein the predetermined manner comprises dithering the coefficients by independently fluctuating the magnitude and phase for each element of the array, wherein the fluctuations are independent from element to element, determines an actual signal that represents either the sensor response to the modified transmission or the phased array antenna output with the modified coefficients, and simultaneously corrects the coefficients for all of the elements in a manner that is based on the reference signal and the actual signal, the correction accomplished by determining an error signal based on a complex conjugation of the difference between the actual signal and the reference signal and minimizing the error signal, such that either the modified phased array antenna transmission becomes closer to the desired transmission or the modified phased array antenna reception becomes closer to the desired reception.

8. The system of claim 7 in which the error signal is minimized using a gradient-based algorithm.

9. The system of claim 8 in which the algorithm uses all states of a total component of the modified phased array antenna transmission at the sensor.

10. The system of claim 8 in which the algorithm uses all states of a total component of the modified phased array antenna reception.

11. The system of claim 7 in which the correction is further accomplished by minimizing a gradient of the error signal.

12. The system of claim 7 in which the reference signal is predetermined and then stored in the memory.

* * * * *